US009286272B2

(12) United States Patent
Harrington

(10) Patent No.: US 9,286,272 B2
(45) Date of Patent: Mar. 15, 2016

(54) METHOD FOR TRANSFORMATION OF AN EXTENSIBLE MARKUP LANGUAGE VOCABULARY TO A GENERIC DOCUMENT STRUCTURE FORMAT

(75) Inventor: Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2047 days.

(21) Appl. No.: 11/610,324

(22) Filed: Dec. 13, 2006

(65) Prior Publication Data

US 2007/0150808 A1 Jun. 28, 2007

Related U.S. Application Data

(60) Provisional application No. 60/753,043, filed on Dec. 22, 2005.

(51) Int. Cl.
  *G06F 17/22* (2006.01)
(52) U.S. Cl.
  CPC .......... *G06F 17/2247* (2013.01); *G06F 17/227* (2013.01)
(58) Field of Classification Search
  CPC .......................... G06F 17/227; G06F 17/2247
  USPC .................................................. 715/236, 239
  See application file for complete search history.

(56) References Cited

U.S. PATENT DOCUMENTS

| | | | |
|---|---|---|---|
| 6,370,553 B1 | 4/2002 | Edwards et al. | |
| 6,397,231 B1 | 5/2002 | Salisbury et al. | |
| 6,519,617 B1 | 2/2003 | Wanderski et al. | |
| 6,540,142 B1 | 4/2003 | Alleshouse | |
| 6,606,642 B2 | 8/2003 | Ambler et al. | |
| 6,655,593 B2 | 12/2003 | Alleshouse | |
| 6,668,354 B1 * | 12/2003 | Chen et al. | 715/255 |
| 6,748,569 B1 | 6/2004 | Brooke et al. | |
| 6,829,745 B2 | 12/2004 | Yassin et al. | |
| 6,908,034 B2 | 6/2005 | Alleshouse | |
| 6,912,538 B2 | 6/2005 | Stapel et al. | |
| 6,925,631 B2 | 8/2005 | Golden | |
| 6,941,511 B1 | 9/2005 | Hind et al. | |

(Continued)

FOREIGN PATENT DOCUMENTS

WO    WO2004084094    9/2004

OTHER PUBLICATIONS

Anand, Sai et al. "Mapping XML Instances". May 2005, Association for Computing Machinery.*

(Continued)

*Primary Examiner* — Cesar Paula
*Assistant Examiner* — Tyler J Schallhorn
(74) *Attorney, Agent, or Firm* — Basch & Nickerson LLP

(57) ABSTRACT

A method determines structures and features of an original document to make style decisions. The extensible markup language of the original document is analyzed to produce instance mapping. The document type definitions of the original document are analyzed to produce document type definitions mapping. Lastly, the instance schema of the original document is analyzed to produce schema mapping. A transform is generated from the produced instance mapping, document type definitions mapping, and schema mapping. The transform is applied to the original document to generate an instance in an intermediate format. A stylesheet is selected and applied to the intermediate format to produce a styled document.

10 Claims, 3 Drawing Sheets

(56) References Cited

U.S. PATENT DOCUMENTS

| | | | |
|---|---|---|---|
| 7,143,104 | B1 | 11/2006 | Turba |
| 7,152,205 | B2 | 12/2006 | Day et al. |
| 7,284,196 | B2 | 10/2007 | Skeen et al. |
| 7,409,400 | B2 | 8/2008 | Ramarao |
| 2001/0018697 | A1 | 8/2001 | Kunitake et al. |
| 2001/0039594 | A1 | 11/2001 | Park et al. |
| 2002/0010715 | A1 | 1/2002 | Chinn et al. |
| 2002/0040353 | A1 | 4/2002 | Brown, Jr. et al. |
| 2002/0073399 | A1 | 6/2002 | Golden |
| 2002/0107913 | A1 | 8/2002 | Rivera et al. |
| 2002/0111963 | A1 | 8/2002 | Gebert et al. |
| 2002/0194227 | A1* | 12/2002 | Day et al. .................. 707/523 |
| 2003/0058469 | A1 | 3/2003 | Buis et al. |
| 2003/0061229 | A1 | 3/2003 | Lusen et al. |
| 2003/0088543 | A1 | 5/2003 | Skeen et al. |
| 2003/0184789 | A1 | 10/2003 | Komaki |
| 2003/0227640 | A1 | 12/2003 | Liang et al. |
| 2003/0237046 | A1 | 12/2003 | Parker et al. |
| 2004/0060004 | A1 | 3/2004 | Mani et al. |
| 2004/0088647 | A1 | 5/2004 | Miller et al. |
| 2004/0193465 | A1 | 9/2004 | Sangroniz et al. |
| 2004/0205656 | A1 | 10/2004 | Reulein et al. |
| 2004/0216030 | A1 | 10/2004 | Hellman et al. |
| 2004/0261017 | A1 | 12/2004 | Perry |
| 2004/0268229 | A1 | 12/2004 | Paoli et al. |
| 2005/0004893 | A1 | 1/2005 | Sangroniz |
| 2005/0021799 | A1 | 1/2005 | Imamura et al. |
| 2005/0050466 | A1 | 3/2005 | Sangroniz et al. |
| 2005/0055420 | A1 | 3/2005 | Wyler |
| 2005/0150953 | A1 | 7/2005 | Alleshouse |
| 2005/0171970 | A1 | 8/2005 | Ozzie et al. |
| 2005/0204280 | A1 | 9/2005 | Eves et al. |
| 2006/0167909 | A1 | 7/2006 | Mendis et al. |
| 2006/0271506 | A1* | 11/2006 | Bohannon et al. ............ 707/2 |
| 2006/0271850 | A1 | 11/2006 | Gombert et al. |
| 2007/0143666 | A1 | 6/2007 | Harrington |
| 2007/0150494 | A1 | 6/2007 | Harrington et al. |
| 2007/0198539 | A1 | 8/2007 | Warshavsky et al. |
| 2007/0226610 | A1 | 9/2007 | Da Silva et al. |
| 2007/0245232 | A1* | 10/2007 | Wake et al. .................. 715/513 |

OTHER PUBLICATIONS

Bossung, Sebastian et al. "Automated data mapping specification via schema heuristics and user interaction". Sep. 2004, IEEE Computer Society.*

Bossung, Sebastian et al. "Semi-automatic discovery of mapping rules to match XML Schemes". Nov. 25, 2003, University of Auckland.*

Boukottaya, Aida et al. "Automating XML document Transformations: A conceptual modelling based approach". 2004, Australian Computer Society.*

Embley, David W. et al. "Automatic Direct and Indirect Schema Mapping: Experiences and Lessons Learned". 2004, Association for Computing Machinery.*

Su, Hong et al. "Automating the Transformation of XML Documents". 2001, Association for Computing Machinery.*

Berners-Lee, Tim et al. "Request for Comments 1866: Hypertext Markup Language—2.0". Nov. 1995, W3 Consortium.*

Su, Hong et al. "Automating the Transformation of XML Documents" in "Proceedings of the 3rd International Workshop on Web Information and Data Management". 2001, Association for Computing Machinery. <http://doi.acm.org/10.1145/502932.502946>.*

Waroruntu, Stella et al. "XSLTGen: A System for Automatically Generating XML Transformations via Semantic Mappings". 2004, Springer-Verlag.*

The file history of U.S. Appl. No. 11/304,857 as of Apr. 22, 2009.

The file history of U.S. Appl. No. 11/610,950 as of Apr. 22, 2009.

The file history of U.S. Appl. No. 60/753,043 as of Apr. 22, 2009.

The prosecution history for U.S. Appl. No. 11/304,857 between Apr. 22, 2009 and Nov. 16, 2009.

The prosecution history between Apr. 2, 2010 and Oct. 4, 2010 for U.S. Appl. No. 11/610,950.

The prosecution history between Nov. 19, 2009 and Jul. 22, 2010 of U.S. Appl. No. 11/304,857.

The prosecution history between Apr. 22, 2010 and Aug. 9, 2010 of U.S. Appl. No. 11/610,950.

The prosecution history between Aug. 10, 2010 and Mar. 8, 2011 for U.S. Appl. No. 11/304,857, filed Dec. 15, 2005, published Jun. 21, 2007 as US-2007-0143666-A1; Inventor S.J. Harrington.

The prosecution history between Jan. 11, 2011 and Mar. 28, 2011 for U.S. Appl. No. 11/304,857, filed Dec. 15, 2005; published Jun. 21, 2007 as US-2007-0143666-A1; Inventor Steven J. Harrington.

The Prosecution History Between Mar. 8, 2011 and Oct. 25, 2011 for U.S. Appl. No. 11/304,857, filed Dec. 15, 2005, Published Jun. 21, 2007, as US-2007-0143666-A1; Inventor: Steven J. Harrington.

The Prosecution History Between Oct. 5, 2010 and May 10, 2012 for U.S. Appl. No. 11/610,950, filed Dec. 14, 2006, Published Jun. 28, 2007, as US-2007-0150494-A1; Inventor: Steven J. Harrington et al.

Bossung et al, "Automated data mapping specification via schema heuristics and user interaction" Oct. 18, 2004, IEEE, pp. 1-10 + one abstract page, 11 pages.

Chatvichienchai (Somchai) et al "Authorization Translation for XML Document Transformation", 2004, Kluwer Academic Publishers, p. 1-28.

The Prosecution History for U.S. Appl. No. 11/610,950 between Apr. 22, 2009 and Apr. 5, 2010.

* cited by examiner

METHOD FOR TRANSFORMATION OF AN EXTENSIBLE MARKUP LANGUAGE VOCABULARY TO A GENERIC DOCUMENT STRUCTURE FORMAT

PRIORITY INFORMATION

This application claims priority under 35 U.S.C. §119(e) from U.S. Provisional Patent Application, Ser. No. 60/753,043, filed on Dec. 22, 2005. The entire content of U.S. Provisional Patent Application, Ser. No. 60/753,043, is hereby incorporated by reference.

BACKGROUND

Encoding documents for digital printing is conventionally done in a document or image processing device that is typically separate from the printing device. The processing device may be a personal computer or other document/image processing/generation device. The processing device, typically, has a generic print driver application that encodes and sends documents for reproduction by a particular printer connected thereto, through a communication channel or network.

The generation of standard document types is a growing trend. Such standards have been greatly encouraged and facilitated by the use of the standard extensible markup language. However, the reproduction of standard extensible markup language is not an easy task as the standard extensible markup language has been, conventionally, converted by the user into some type of format that is readily acceptable to a printing device.

Moreover, most conventional extensible markup language processing systems have been designed to handle specific processing with respect to specific extensible markup language vocabularies. Although a few conventional extensible markup language platforms have been created for the development of different processing sequences in support of different vocabularies and workflows, these conventional platforms are still fixed and static.

Representations such as extensible markup language allow the creation of vocabularies to express data and documents. These vocabularies provide a mechanism for expressing the semantics of the information along with its structure. However, to view the information, a stylesheet is needed which understands the semantics and how the information should be presented.

It is a further problem when documents are composed of parts of other documents because a compatible set of stylesheets that matches all of the vocabularies must be assembled.

Furthermore, extensible markup language allows the capture of information from full documents for people to the data of messages. Some extensible markup language vocabularies (such as scalar vector graphics) contain formatted document information. Moreover, some extensible markup language vocabularies (such as extensible stylesheet language formatting objects) contain formatting instructions. However, most extensible markup language vocabularies encode information without formatting.

In order to present the document for human consumption, formatting information must be introduced and applied. This is typically done through a stylesheet. However, it is possible to view the document without a stylesheet because a stylesheet does not exist, is unavailable, or is inappropriate for the display device. Default stylesheets are possible, but the default stylesheets typically do not provide very satisfactory renditions.

Thus, it is desirable to provide a format for which generic style sheets could be written, and into which arbitrary vocabularies could be translated. Moreover, it is desirable to convert a document to an intermediate format that represents the document's structure and for which stylesheets could be predefined. Furthermore, it is desirable to analyze a document to determine a mapping between a native vocabulary of the document and another vocabulary, thereby enabling an application of a generic document layout and style.

BRIEF DESCRIPTION OF THE DRAWINGS

The drawings are only for purposes of illustrating an embodiment and is not to be construed as limiting, wherein.

DETAILED DESCRIPTION

Figure 1:
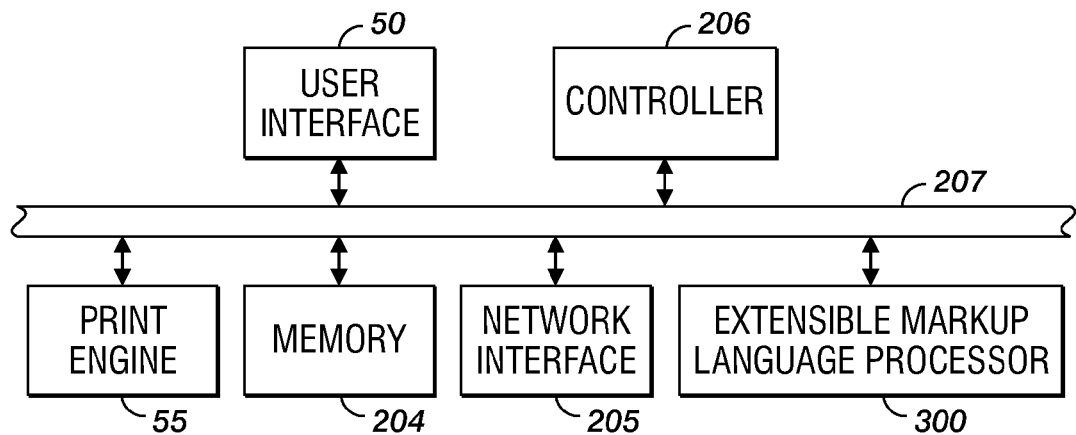
FIG. 1 illustrates the architecture of a device with an embedded extensible markup language processor.

For a general understanding, reference is made to the drawings. In the drawings, like references have been used throughout to designate identical or equivalent elements. It is also noted that the drawings may not have been drawn to scale and that certain regions have been purposely drawn disproportionately so that the features and concepts could be properly illustrated.

FIG. 1 illustrates an overall system architecture that includes a print engine 55, a user interface 50, a memory 204, a network interface 205, a controller 206, an extensible markup language processor 300, and a bus 207.

The print engine 55 converts digital signals representing an image into a hardcopy of that image on a recording medium. A central bus 207 provides interconnections and intercommunications between the various modules and devices connected thereto. A memory 204 store a variety of information such as machine fault information, machine history information, images to be processed at a later time, instruction sets for the machine, job instruction sets, etc.

The user interface 50 allows the user to select the various functions of the digital printing device, program various job attributes for the particularly selected function, provide other input to the digital printing device, as well as, display informational data from the digital printing device. The controller 206 controls all the functions within the digital printing device so as to coordinate all the interactions between the various modules and devices.

The extensible markup language processor 300 receives extensible markup language data and converts this data into a page description language which can readily utilized by the controller 206 and print engine 55 to generate the appropriate document or image. The details of this process will be explained in more detail below.

The following descriptions will useful in understanding the operations of the extensible markup language processor.

Extensible markup language is a conventional standards-based way of organizing data and metadata in the same document. More specifically, extensible markup language is not a fixed format, but rather a meta language that enables the design of customized markup languages for different types of documents. Extensible markup language is a markup language because every structural element is marked by a start tag and an end tag giving the name of the element. In other words, the metadata of the extensible markup language is enclosed within tags. With respect to the input stream of the document, a tag may be delimited by the symbols "<" and ">". In one implementation, extensible markup language can be used as the format for receiving input data and metadata.

An extensible markup language vocabulary is a collection of extensible markup language tags (element and attribute names) intended to be used together as a single markup language. An extensible stylesheet language transform is a set of rules for transforming a source extensible markup language document into a result extensible markup language document, using the syntax defined in extensible stylesheet language transformations. Extensible stylesheet language transformations are often used to insert styling instructions into an extensible markup language document or to convert the extensible markup language document into an extensible markup language vocabulary designed for formatting.

An extensible stylesheet language transform imparts style to the data and can also be a general tree transformation language. Moreover, an extensible markup language schema is the formal definition of an extensible markup language vocabulary.

An extensible stylesheet language transform is a way of expressing a mapping of metadata tags and print format instructions.

Since an extensible stylesheet language transform and an extensible markup language schema are text based documents, the extensible stylesheet language transform and extensible markup language schema can be easily stored in a memory. Although extensible stylesheet language transforms can be written that work well in the absence of an extensible markup language schema, more expressive mappings can be written in an extensible stylesheet language transform if an extensible markup language schema for the input document is supplied.

The extensible stylesheet language is an extensible markup language vocabulary for specifying formatting semantics.

As noted above, extensible markup language processing systems have been designed to handle specific processing on specific extensible markup language vocabularies and workflows. Vocabularies are developed for specific problems and needs. The workflows to handle those problems are generally fixed such that each extensible markup language file undergoes the same processing steps.

Conventional extensible markup language processing systems have also been designed for the development of different processing sequences in support of different vocabularies and workflows. However, these extensible markup language processing systems are still fixed and static.

More specifically, these extensible markup language processing systems assemble pipelines of processing steps so that the system has a variety of processing steps from which to choose. However, notwithstanding the variety, the extensible markup language process is defined by a fixed sequence of steps. Extensible markup language files can be processed through the pipeline, but the pipeline is not dynamic or reconfigurable. Further, if any step in the pipeline stalls (e.g. while waiting on data retrieval) all of the processing is temporarily halted.

Thus, it is desirable to provide an extensible markup language processing system that is able to efficiently print any arbitrary sequence of extensible markup language vocabularies that are submitted. More specifically, it is desirable to provide an extensible markup language processing system that is able to provide a printing component that can support any workflow as well as arbitrary submissions.

Extensible markup language files differ from traditional page description language files in the degree of document completion. While some vocabularies (such as scalable vector graphics) may be laid out and ready for printing, other vocabularies require more processing before printing can be attempted. The processing can include retrieval of information and insertion of files, conducting database queries, performing transformations, styling, formatting, and layout. Different vocabularies and even different jobs using the same vocabulary can require different processing specifications.

Figure 2:
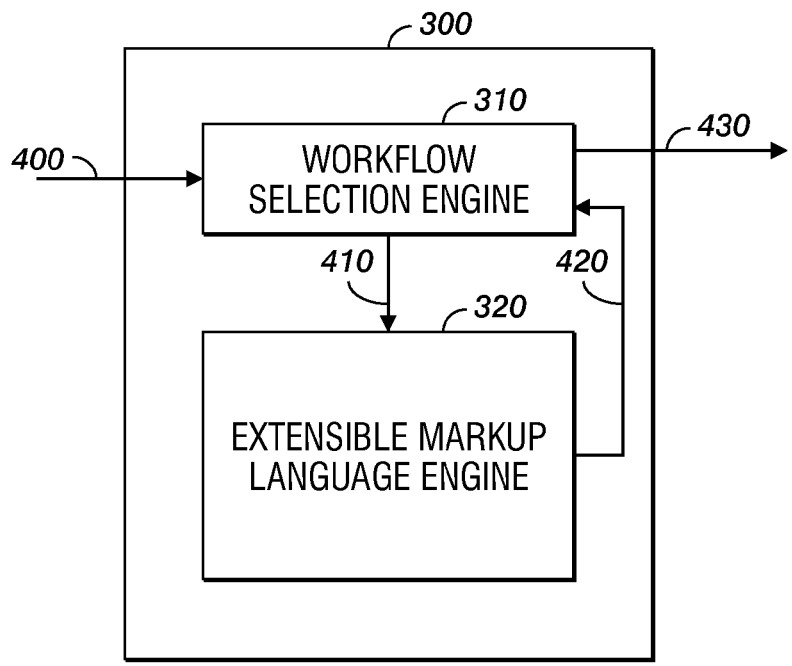
FIG. 2 illustrates a block diagram of an extensible markup language processing system.

FIG. 2 illustrates a system and architecture for extensible markup language document processing engine 300 that addresses the various problems discussed above. The extensible markup language document processing engine 300 is suitable for parallel processing of dynamically determined workflows.

As illustrated in FIG. 2, the extensible markup language document processing system 300 receives two basic data element types 420, a document fragment and a workflow specification. There are many options for how these two data elements are implemented.

For example, in an object oriented implementation, document fragment objects and workflow specification objects could be defined. Alternatively, in another system, a document fragment could be defined as a uniform resource locator, and the processing in a workflow specification might be defined as the selection of a predefined pipeline. Another option might be to represent document fragments as files and workflow specifications as scripts. Each workflow specification has a corresponding document fragment. It is noted that a document fragment and its workflow specification might be combined into a single object.

A document fragment's workflow specification describes the processing that should be carried out on that document fragment. The conventional extensible markup language document processing system typically results in one or more new or revised document fragments. However, the extensible markup language document processing engine 300 differs from the conventional systems in that the extensible markup language document processing engine 300 also generates new workflow specifications.

The extensible markup language document processing system 300 deciphers the workflow specification in the workflow selection engine 310. The extensible markup language document processing system 300 also performs the processing on a document fragment in the extensible markup language engine 320. The extensible markup language engine 320 receives workflow specifications and document fragments to be processed 410. Upon receiving this data, extensible markup language engine 320 decides which pipeline is specified for the document fragment and runs that document fragment through the pipeline. However, as noted above, in this architecture, the pipelines of the extensible markup language engine 320 produce new workflow specifications as well as modified fragments 400.

The results 400 of the processing operations of the extensible markup language engine 320 are fed back to the workflow selection engine 310. The workflow selection engine 310 determines if the received results 400 are a final output 430 or require further processing 410.

A workflow specification may indicate processing that requires or integrates additional information beyond the fragment itself. For example, the workflow specification might require the insertion of data from a file or other fragment. Also, the workflow specification might transform the fragment using an additional style sheet or validate the fragment using an additional schema. The workflow specification might include a list of the required resources.

Moreover, a workflow specification may indicate processing that produces more than one fragment-workflow specification pair as its result. For example, the workflow specification might subdivide the fragment into smaller fragments. In that case, the process would result in a set of sub-fragments, each sub-fragment having a workflow specification, and, optionally, a fragment that references the set of sub-fragments and a workflow specification that reintegrates the processed sub-fragments.

The extensible markup language document processing engine 300 also determines, configures, and performs diverse processing which various jobs may require. In addition, the extensible markup language document processing engine 300 can separate the processing into multiple independent threads, where appropriate, so that if one thread is blocked or delayed, processing can still continue on other threads.

As noted before, the workflow specification indicates the processing to be done on a document fragment. However, processing, from time to time, may involve requiring the use of additional information or resources, as illustrated in FIG. 2. In these instances, the workflow specification may list the resources. This is particularly desirable when the resources are other processed document fragments. The information involving the use of additional information or resources is used by a workflow selection engine.

Figure 3:
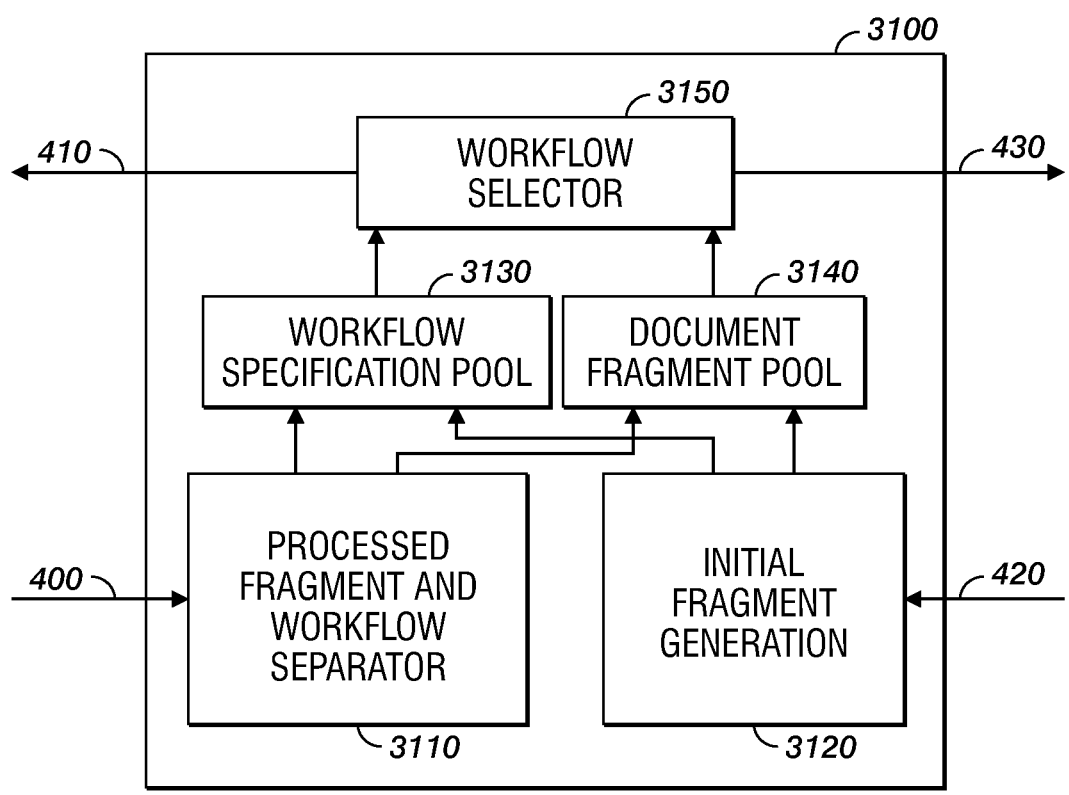
FIG. 3 illustrates a block diagram of another example of a workflow selection engine for an extensible markup language processor.

An example of a workflow selection engine is illustrated in FIG. 3. As illustrated in FIG. 3, an initial document 420 is received by an initial fragment generator 3120 which breaks the initial document 420 up into document fragments and workflow specifications. The initial fragment generator 3120 send the workflow specifications to a workflow specification pool 3130 and sends the document fragments to a document fragment pool 3140. A workflow selector 3150 examines the workflow specifications to determine whether the resources required to support the processing are available to process the initial document 420.

For example, if the workflow specification indicates the aggregation of previously processed sub-fragments, a workflow selector 3150 determines if the processing of these sub-fragments has been completed. The workflow selector 3150 decides which fragments are ready for processing and submits the fragments 410 to the extensible markup language processing engine 320 of FIG. 2. The workflow selector 3150 also determines when all processing on the document is complete and outputs the final result 430.

A processed fragment and workflow separator 3110 collects the results 400 from the extensible markup language processing engine 320 of FIG. 2 and stores the separated results in the document fragment pool 3140 and workflow specification pool 3130.

One possible implementation of the workflow selection engine 3100 is as a web service that interacts with other services. Alternatively, the workflow selection engine 3100 might be implemented as a method that operates on a workflow pool object in a more direct programming approach.

In operations, the workflow selection engine 3100 accepts a document 420 for processing. Using the initial fragment generator 3120, the document and associated job information are separated into an initial fragment and workflow specification. The initial fragment and workflow specification 410 is then submitted to the extensible markup language processing engine 320 of FIG. 2 and the results 400 returned. For simple jobs, this may be all that is necessary and the processed fragment would be output.

However, some processing options might be analyzers that decide what additional processing is needed. The analyzers result in new workflow specifications, not just modified documents.

For example, a document may be transformed in such a way as to generate file inclusions, database queries, or additional transformations. In the workflow selection engine 3100, an analyzer detects the transformation and specifies the appropriate additional processing, thereby avoiding the anticipating of such possibilities in advance and predefining the processing pipeline.

The workflow selection engine 3100 may also detect processing that requires external resources. If the workflow selection engine 3100 detects the requirement for external resources, the workflow selection engine 3100 separates the external resource processing into its own fragment and workflow specification. In this way, delays in resource acquisition need not block other processing.

It is noted that there is no requirement that the document fragment pool 3140 and workflow specification pool 3130 contain elements from only one document. The workflow selection engine 3100 may allow multiple documents as well as multiple parts of a document to be processed in parallel.

Moreover, workflow selection engine 3100 might construct workflows dynamically. On the other hand, workflow selection engine 3100 may select from a set of basic predefined workflows, such as: check the syntax of a fragment to see if it is well-formed; examine the namespaces of a fragment and separate into sub-fragments by namespace, including a fragment for reintegration; examine the fragment for special namespaces (e.g. scalable vector graphics, extensible stylesheet language formatting objects, extensible hypertext markup language, personalized print markup language template) and assign a matching workflow specification; examine a fragment and determine what style transformation if any should be applied and assign a workflow to apply the transformation; separate file inclusions as sub-fragments and specify workflows to retrieve and insert the files, also constructing a fragment for the reintegration; insert files specified by a fragment and assign a workflow to analyze the result for further processing; and/or apply a transformation to a fragment and assign a workflow to analyze the result for further processing.

As noted above, extensible markup language permits the separation of document content and style. In order to view the document, the style and layout information is established by applying a stylesheet. Stylesheets are rare and usually difficult to create. Even when a stylesheet exists, the stylesheet may not be appropriate to the desired output device or format.

Extensible stylesheet language provides a language for the creation of stylesheets, but such stylesheets are typically matched to a particular extensible markup language vocabulary. A stylesheet may produce the desired effect for one vocabulary, but the same stylesheet, conventionally, cannot be used with a different vocabulary. Thus, it is desirable to generalize a stylesheet so that the stylesheet can be applied to documents other that those of the vocabulary to which the stylesheet was originally intended.

Initially, to realize a stylesheet that can be applied to documents other that those documents having the vocabulary to which the stylesheet was originally intended, generic equivalents to particular vocabulary specific element references are determined. Thereafter, the generic equivalents replace the specific references in the stylesheet. Documents with arbitrary vocabularies are also converted to corresponding generic semantics directed towards styling and layout. The converted stylesheet can then be applied to the converted document.

More specifically, a document format can be expressed using logical structure and attributes relevant to styling such that a document's semantics are geared towards presentation. This document format does not directly contain the style or layout information, but rather the document format structures and labels document components in a way that is consistent with typical styling practices.

For example, font family, font size, and color are typically associated with strings, while line spacing and indentation are associated with paragraphs. Bullet style is associated with a list and cell alignment is associated with a table.

The document format defines the string, paragraph, list, and table objects to which the style properties can be bound. The document format is generic in that the document format only attempts to describe the logical structure that typical documents employ for styling. This document format allows documents with arbitrary vocabularies to be translated into this document format, whereupon styling and layout may be performed.

As noted above, the generic document format captures the logical structure of the document and attributes relevant to layout. This generic document format limits the semantics to only what is needed for layout and provides a target representation for use with generic stylesheets. This generic document format can be useful for styling extensible markup language documents that lack appropriate stylesheets. This generic document format can also provide a common vocabulary into which documents that have mixed vocabularies can be transformed. Further, this generic document format can be helpful in developing correspondences between elements of different vocabularies.

To realize the generic document format, some basic content elements and logical relationships therebetween are identified. Also, structures which arise from logical relationships (for example, lists and tables) and structures which arise from the content encoding (for example, strings) are distinguished.

Once a generic document format is realized, a set of stylesheets can be defined for the generic document format. In other words, using the stylesheets defined for the generic document format, if a document is transformed into the generic document format, these stylesheets may be applied to the document.

Thus, the generic document format provides a target representation for use with generic stylesheets. The generic document format can also provide a common vocabulary into which documents that have mixed vocabularies can be transformed, thereby enabling the development of correspondences between elements of different vocabularies.

The elements of the document format being defined should match the binding of style parameters as well as capture the logical relationships that style is often used to convey. The generic document format supports two types of content, namely text and image. For text, a distinction is made between the logical structuring of the content, and the structure arising from the encoding of that content. The basic content element for text is the Paragraph.

Paragraphs can be part of more complex logical structures such as lists or tables. Within the paragraph there are characters that make up words, words that make up sentences and sentences that form the content element. This is a reflection of the way text is encoded as a linear sequence.

In the document format being defined, this structure is expressed as a String element. The String can contain a text literal, or other String element, or a mixture of Strings and text literals. The style properties associated with Paragraphs include properties, such as line spacing, left and right indentations, first line indentation, before and after spacing, and quadding (alignments). The style properties associated with Strings include, for example, font family, font size, font weight, character spacing, and character color.

The generic document format includes a Graphic element for non-text content. This could be images or graphics. The Graphic element is typically treated as a foreign object. Style properties associated with the Graphic element could include spacing before or after it, borders, and background.

For systems that are aware of fine distinctions and additional style choices, an expansion of the non-text elements might be needed. For example, one might distinguish between graphics and images and perhaps give images a gamma correction style property. One might also express greater detail in the description of graphics, perhaps distinguishing strokes from polygons and associating end-cap style properties with strokes and fill pattern properties with the polygons. The document format should be able to express the logical structures and style binding of the system. For an extensible markup language system, text and non-text elements are usually adequate.

There is an additional content element, Ignore, which is applied to content that is not expected to be presented and viewed. This can be used for metadata and for elements in the original vocabulary that have attributes, but no content.

Instances of the above content elements can be combined in higher-order structures. The simplest such structure is the Group. Elements in a group belong together, but there is no required ordering. Style properties associated with a group might include border, background, indents, and spacing before and after.

Elements can also be organized into lists, which differ from groups in that there is an order relationship among the elements. The generic document format defines two list types: Homogeneous List, where all of the list elements of the list have identical type, and Heterogeneous List, where the list elements can have different types. The reason for the two types is that homogeneous lists may offer opportunities for styling that heterogeneous lists do not. For example, the attributes of the elements of a homogeneous list might be presented as a table. Also numbering typically makes more sense for a homogeneous list. In addition to the style properties associated with groups, lists can specify labeling such as numbering or bulleting as well as properties of the labels such as their positions.

One way to define lists is to separate the list element (that specifies ordering and has the style properties of a group) from a List item element (that specifies the label and has associated the label style properties). Lists then contain list items which in turn contain the various list content structures. The advantage of this additional layer of structure is that it supports the use of different label specifications for different list members.

The format also includes support for two-dimensional relationships in the form of a Table. In implementation, this element contains a table body and optional header and footer elements. Headers and footers can be generated at the start and end of each page that the table covers. Style properties can describe when and where headers and footers should appear as well as border and background properties.

A TableBody element contains the sequence of rows that form the table. A TableBody can have its own border and background style specifications.

TableRow elements are used to specify the rows of the table body as well as the table header and footer content. In addition to border and background properties, and table row can have associated height and visibility style decisions.

Each table row is composed of TableCell elements. Style properties that can be associated with table cells can again be border, background, and visibility, but in addition can include the horizontal and vertical alignments of the cell content.

While the above set of elements describes one implementation, other variations and additions are possible. One might, for example, have a particular element for numbers if there are style specifications particularly targeted towards numbers (e.g. Arabic or Roman numerals). A format can be defined that matches the styling capabilities that are to be supported and captures the logical structure of the document which those style properties are meant to convey.

Style properties can be used to convey information besides the document's logical structure. If, for example, a word is important, it might be emphasized with size or weight or color. In order to construct stylesheets that can be applied to documents created in an arbitrary vocabulary; an arbitrary vocabulary is converted to a generic form sufficient for attaching the style specification. That form should contain a means for attaching style that conveys information other than structure. Attributes that can be used to make style decisions are added to the structure independent of the vocabulary. One such attribute might be a class identifier that identifies the original element.

For example, paragraphs mapped from dates could then be distinguished from paragraphs mapped from addresses. One could use the original element name as the value of the class attribute, but the class attribute then looks vocabulary dependent.

Alternatively, one could use generic names such as class1, class2, etc., but this just hides the dependency, since there is no reason for element mapped to class1 for vocabulary A to match in any way elements mapped to class1 for vocabulary B.

A class attribute, then, is only valuable for determining if two elements originated from the same class, but not how that class should be styled. As such, it does not much matter if original element names or generic substitutes are used. What are needed are generic properties that capture the motivation behind the style specification.

If, for example, one had an "importance" property, the stylesheet could emphasize elements with high importance values. It would not matter what the originating vocabulary was, so long as the importance attribute was appropriately set. Since the potential types of information that one might wish to convey through style choices is unlimited, it might seem that the number of possible attributes is also unlimited.

However, one should only need enough attribute dimensions to match the degrees of freedom offered by the style choices. This could still be large. However, in order to actually communicate information through style, the viewer must be able to distinguish and interpret the choices. This tends to limit the effective attribute dimensionality.

Another issue is how to quantify the attributes for a given vocabulary. As in the case of the structural mapping, heuristic measures can be applied to the information available. That information may be the document instance, but might also include the schema or document type definitions, other document instances, and possibly stylesheets designed for the vocabulary.

The following is, as an example, a discussion of possible attributes, some of which might be used for generic styling.

The attributes which characterize content attempt to quantify the probability that the element is of a certain type. Therefore, the values of these attributes range from 0 to 1. A possible method of assigning values to these attributes is to look for the name of the type in the element name or element type name. Another possible method is to scan the content for words commonly associated with the type. For example, the element name can be scanned for 'address', 'St.', etc.

A Naming element names an organization, place, person, etc. More specifically, a Person Naming element often contains a first name and last name. An element which has a high Address-like value has components such as street, city, and zip code. These elements would use one of several standard address styles. Date-like and Time-like elements describe a date or time. This attribute can be used to select among many date and time formats in general use.

Text-Like elements are composed of strings characters separated into words. Sentence-like elements also have punctuation and capitalization. Title-like elements have most words capitalized. In contrast, Data-like elements do not look like sentences or titles. Data-like elements may have unusual capitalization or numbers interspersed throughout. In schema, Data-like elements could be enumerated types, tokens, or one of the legacy types such as ID, or ENTITY. An element with a high Number-like value contains a high proportion of numerals. Data-like and Number-like elements could be styled with different fonts.

Metadata-like elements describe the content of the elements to which they refer. These elements give additional information which could be helpful in assigning values to the attributes of other elements or in determining style of other elements.

Whitespace-important is a measure of how important to the integrity of the information it is to preserve the whitespace such as tabs, and spaces.

The Importance attribute indicates whether this element is the primary or main content. Often Important elements appear near the beginning of the document. Elements with the words 'warning,' 'caution,' 'danger' could also be important. The style for important elements could emphasize the importance using italics or color, for example. The Centrality attribute measures the probability that this element contains the core message or main theme of the document. The element may be named 'body' or 'main' and would contain a high concentration of key words recurring throughout the document. The Distinctiveness attribute is a measure of how different this element behaves or appears compared to its neighbors.

A variety of attributes may be defined which capture various functions of elements. A Labeling element gives information, such as ownership, identity, or price, of another element. For example, captions or section numbers are Labeling. These elements may be styled in a complementary manner to distinguish them from the elements which they label. A Summarizing element covers the main points of the document in a succinct manner. An Anchor element is referenced in another part of the document, for example a footnote or hyperlink target. A Referencing element is a notation or direction at one place to pertinent information at another place. The word 'reference' or 'ref' may be present in the content or element name or type name. Hyperlinks are also referencing.

An element which has a high Attention-grabbing value is one which should stand out from its surroundings, for example advertising material. Often the words 'warning,' 'caution,' or 'danger' are present in the content or element name. A style which is dramatically different from the style of the surrounding elements could be applied to an Attention-grabbing element.

The function of some elements is to identify something. The function of other elements specify some member of a set.

Elements that contain names are often identifying. Elements that provide knowledge and understanding are Informing. There are also Decorating elements that tell how to handle other elements. Elements that specify style are examples of Decorating elements. Separating element act to separate other elements. A rule inserted between two paragraphs is an example of a separating element.

Some structural attributes are useful in computing values of other the classes of attributes. Some of the structural attributes have values ranging from 0 to 1 and others range over the positive integers. If these attributes are calculated from an instance document, typical values can be determined since other instance documents of the vocabulary may have different compositions. If a schema is available for analysis, more definitive values may be assigned.

Typical size of contained content is the number of characters in this node and all children nodes of all subtrees. Typical number of children, Typical number of siblings, and Typical number of attributes can be useful in computing the Fragment Characterization Attributes such as Distinctiveness. Typical diversity of children and Typical diversity of siblings are a measure of how many different element types are represented by the children or siblings.

A possible method of computation is to simply find the ratio of the number of different types to the number of children or siblings. The attribute Typical similarity to siblings measures how many of the sibling elements have the same type as this element. Typical position among siblings is the order of appearance of this element in the list of siblings. This value might be used in the computation of the Importance attribute. The value of Typical depth in document tree, which could be calculated, for example, as the number of generations between this node and the root, is helpful for determining values of some Content Characterization Attributes. For example, Title-like elements are typically closer to the root and Anchor elements are typically deeper.

We do not claim that the attributes listed are the complete or even the correct set, but provide them only as an example of how generic attributes could be defined for a generic document format relevant to styling.

The following is a description of heuristics for extracting translation mappings from document instances in the arbitrary vocabulary, and from its document type definitions or Schema.

Representations such as extensible markup language allow the capture of information from full documents for people to the data of messages. While some extensible markup language vocabularies such as scalable vector graphics contain formatted document information and others such as extensible stylesheet language formatting objects contain formatting instructions, most vocabularies encode information without formatting.

In order to present the document for human consumption, formatting information must be introduced and applied. This is typically done through a stylesheet. However, it is conceivable that one could wish to view the document without a stylesheet (either because a stylesheet does not exist, or is unavailable, or is inappropriate for the display device). Default stylesheets are possible, but default stylesheets typically do not provide very satisfactory renditions.

It is noted that the conversion of the document to an intermediate format could represent the document structure and for which stylesheets could be predefined. A natural source of information on how to convert from the initial native vocabulary to the intermediate format is the document instance itself. In this implementation, heuristic rules can be applied to a document instance to determine probable mappings from the document vocabulary and the intermediate format.

An instance of a document in some native vocabulary (such as an extensible markup language encoding) can be analyzed to determine a mapping between this native vocabulary and another vocabulary, as an intermediate format. One reason for mapping to the intermediate format is for the application of document layout and style. Stylesheets may be defined for the intermediate format when stylesheets for the native vocabulary may be inappropriate or unavailable. Thus, conversion to the intermediate format can permit styling of the document to go forward.

The intermediate format might also be used to merge document elements from different vocabularies or to apply generic transformations to documents. Information on how to do the mapping from the native vocabulary to the intermediate format can come from a variety of sources. In addition to the document instance, the document type definitions or schema for the vocabulary could be used to determine the mapping.

The intermediate format is designed to capture the semantics of document structures that can be shown by style, layout, and formatting decisions. A possible intermediate format can express logical structure and attributes relevant to styling. Examples of possible attributes are Group—Elements that belong together; List—A group of elements that are ordered; Homogeneous List—A list of elements with identical types; Table—A group of elements that have two-dimensional relationships; A Table is composed of Table Rows, which are in turn composed of Table Cells; Paragraph—for textual content; Graphic—for graphic and image content; Ignore—for information not displayed; and/or String—for the internal structure of text. One may also wish to attach some generic attributes to the structure elements, for example, one might wish to label a string as being number-like.

Since mapping information can come from a variety of sources, and many rules provide probable (not absolute) mappings, probabilities are established for the mapping of each native vocabulary element present in the instance to each of the possible intermediate format element types. The heuristic rules adjust the probabilities. With this approach, it is acceptable if more than one rule matches an element; the element simply receives the probability adjustments from all of the matching rules. This is in fact likely to occur since in many vocabularies an element can appear at multiple points within the document.

At each such point the rule set could be applied to refine the element's mapping. Also, with this approach, probabilities obtained from one information source (such as analysis of a document type definition) can be merged with probabilities from a different source (such as the document schema). After analysis, additional processing may be performed to guarantee that the probabilities are consistent (for example that one does not have a table as the offspring of a string). At the point where one is ready to construct the mapping transformation, the most probable intermediate format element is selected.

The information gained from a document instance is different from that found from a document type definitions or schema, and these differences are reflected in the rule sets. A document type definitions or schema provides better information on the logical structure, since it is this structure that is being defined. One can, in general, have greater certainty that an element should map to a List or a Table by analyzing the schema.

The document instance can provide examples of an element's use suggesting that a Table is appropriate, but document instance cannot guarantee that there will not be some future instance where a table structure will not work. On the other hand, the document instance provides examples of textual content, and these can be quite useful in trying to establish where paragraph breaks should be placed. This is a major factor in the layout of the document.

Examples of heuristic rules that can be used in analyzing the document instance are as follows:

1. Children of mixed content nodes should be mapped to Strings
2. If a node just contains text, it should map to a Paragraph or a String
3. If a node has a repeated child, it should map to a List or a Table
4. If it has no children then it might be a List or Ignore
5. If its children contain text, then it is a List, and the children should map to Paragraphs
6. If it has a repeated child that has multiple children it is likely to be a Table
   a. If it is inconsistent with previous examples, then it is not a Table after all and should map to a List or Group
   b. If it is inconsistent only in the number of elements of the repeated child then it is likely to be a Homogeneous List
7. If it has text ending in punctuation, it is more likely to be a Paragraph
8. If it has text starting with an upper-case character, it is more likely to be a Paragraph
9. If it has text starting with a quote character, it is more likely to be a Paragraph
10. Consecutive numbers should map to Paragraphs
11. Three consecutive single words are likely to be data and should be mapped to Paragraphs
12. If it is a single word, then it is less likely to map to a String
13. If it is a number, then it is less likely to map to a String
14. If the node name contains the substring "name", then its children should map to Strings
15. If the node name contains the substring "date", then its children should map to Strings The rules listed provide a useful set of heuristics for determining the mapping of a vocabulary to the intermediate form. However, additional and alternative rules are possible. The heuristic rule approach is a useful method for analyzing one or more document instances to solve the problem of determining the mapping between an arbitrary vocabulary and a vocabulary designed to capture the document's logical structure as can be conveyed through style and layout. The above rules provide an example of how this approach could be implemented.

The application of such heuristic rules works well when used to adjust probabilities of possible mappings instead of attempting absolute classification. The adjustment of probabilities allows multiple applications of multiple rules and integration of information from multiple sources.

The following rules apply to the constructs of an extensible markup language document type definition:

For elements
1. If an element can have any offspring, then it is a Group
2. Empty elements can be Ignored
3. If a child can occur more than once, then the parent may be a List or Table
   a. If the child is a Paragraph then it is a Homogeneous List
   b. If the child is a fixed size, then it is a Table Row For choices
4. If a child is strongly String or strongly non-String, then the other children should be so as well
5. If children are Strings, then it is a String or a Paragraph For sequences
6. If it has more than one child and a descendant is a Paragraph, then it is a Group, List or Table
7. If it has a member that can have many occurrences, then it is a List
8. If there are multiple occurrences of one element, then it is a Homogeneous List
9. If a child is strongly String or strongly non-String then the other children should be so as well
10. If the children are Strings then it is a String or a Paragraph (and more likely a Paragraph)
11. If the children are more likely non-String, then it is probably a List
12. If there are multiple occurrences of a sequence of Paragraphs, and the sequence is fixed length then it is a Table and the sequence is a Table Row
13. If there is only one item in the sequence then the sequence can be mapped to a List
14. If the element name contains the substring "name" then its children are likely to be Strings
15. If the element name contains the substring "date" then its children are likely to be Strings For mixed nodes
16. Children of a mixed node should be Strings
17. If there are multiple occurrences of a child of a mixed node, then it might be a List, otherwise it is a Paragraph or a String and most likely a Paragraph For PC Data
18. Simple text content is a Paragraph or a String but more likely a Paragraph An extensible markup language schema is similar to a document type definition in defining the grammar for a document vocabulary, and the rules for document type definitions can be re-expressed as rules for schemas. However, schemas let one define types which permits some additional rules to be used.

For built-in types
1. Built-in types map to String
2. Some built-in types can be recognized as number-like (e.g. integer, byte, decimal)

For a constructed simple type
3. Lists map to String
4. Unions map to the type of the atoms when all atoms have the same type, otherwise they map to String For a complex type
5. If it has simple content (not empty and no children) then it maps to Paragraph or String but most likely Paragraph
6. If it is empty it can be Ignored
7. If it has mixed content then it most likely maps Paragraph but also possibly to String
8. The child of a Paragraph or String must be a String For element-only types
9. If it is an "all" group, then it maps to a Group. Any children that can be Paragraphs or Strings have the probability of String diminished and Paragraph strengthened.
10. If there is only one child, and that child is not a group and maxOccurs is greater than 1 then it maps to a List.
11. If there is only one child, and that child is a sequence group, and maxOccurs is greater than 1 then it maps to a Table, the child maps to a TableRow, each member of the child sequence maps to a TableCell
12. If there is only one child, and that child is a choice group, and all of the choices could be Strings, and maxOccurs is unbounded, then it maps to Paragraph or String and the children of the choice have String strengthened.

13. If it is a sequence group with more than one member and some member is a Group or List or Table, then it maps to a List, and any children that could be Paragraphs or Strings have Paragraph strengthened and String diminished.
14. If it is a sequence group with more than one member and some member has maxOccurs greater than 1, then it maps to a List, and any children that could be Paragraphs or Strings have Paragraph strengthened and String diminished.
15. If it is a choice group then if a member is strongly String then map strongly to String and strengthen String probability for its children, but if a member is strongly non-String, then map to Group and diminish the strength of String in the children.
16. If a node's name contains the string "name" then make the children Strings.
17. If the node's name contains the string "date" then make the children Strings.
18. If there are two or more children that are number-like in a row then the children are not Strings, they are Paragraphs or higher structures.
19. If we have a sequence with a member that is strongly a String, then the sequence is likely a Paragraph and all children are more likely Strings
20. If we have a sequence with a member that is strongly Paragraph or higher, then it is a List and its children are not likely to be Strings.
21. If we have multiple occurrences of mixed content, then it might be a List.

The rules listed above provide a useful set of heuristics for determining the mapping of a vocabulary to the intermediate form. However, additional and alternative rules are possible. The heuristic rule approach is a useful method to solve the problem of determining the mapping between an arbitrary vocabulary and a vocabulary design to capture the documents logical structure as can be conveyed through style and layout. The above rules provide an example of how this approach could be implemented.

The application of such heuristic rules works well when used to adjust probabilities of possible mappings instead of attempting absolute classification. The adjustment of probabilities allows multiple rules to be applied and to let influence be integrated from multiple information sources.

A format for which generic stylesheets could be written is provided, and into which arbitrary vocabularies could be translated. If presented with a document without an appropriate stylesheet, the document without an appropriate stylesheet is converted to the generic document format and applies a generic stylesheet from a predefined set.

A process for styling documents first analyzes the document to determine structures and features that might be relevant to style decisions. In the second stage, styling is applied to the structures and features that have been discovered. While the second stage is applied to the specific document instance, the first stage can gather information from a variety of sources. In addition to the document instance, the corresponding schema or document type definitions can be analyzed; information from other document instances might be used, and information might be extracted from an inappropriate stylesheet that matches the document's vocabulary. The second stage processing can designed to apply style based solely on the discovered features and can thereby be independent of the particular document instance or its vocabulary.

A process for applying style to documents is designed for document encodings such as extensible markup language that may separate content from style, capturing the style decisions in the form of a stylesheet. The problem addressed is how to handle cases where the document content is to be printed or viewed, but an appropriate stylesheet is unavailable. One may not have any stylesheets for the given document vocabulary, or the stylesheets available may be inappropriate to the user's interests, or the chosen output device. (This is often the case with generic stylesheets that may provide too much or too little information in a suboptimal form).

Figure 4:
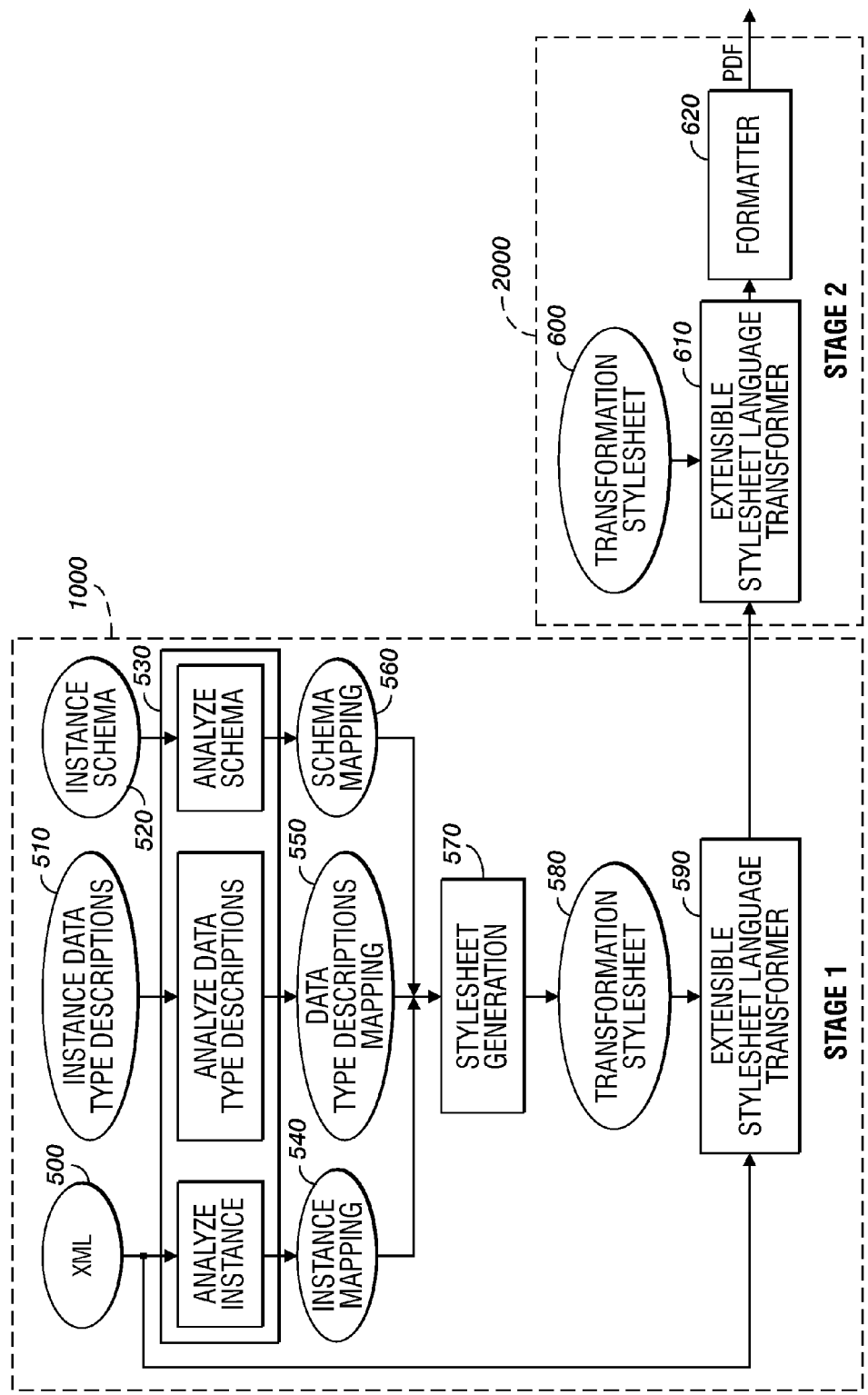
FIG. 4 illustrates a block diagram showing an implementation of two-stage processing for display of documents without formatting information.

To realize the above processes, as illustrated in FIG. 4, a first stage 1000 analyzes the document to determine structures and features that might be relevant to style decisions. In the second stage 2000, styling is applied to the structures and features that have been discovered. While the second stage 2000 is applied to the specific document instance, the first stage 1000 can gather information from a variety of sources.

As illustrated in FIG. 4, an analyzer 530 analyzes extensible markup language 500, instance document type definitions 510, and instance schema 520 by a document instance analyzer, document type definitions analyzer, and a schema analyzer to produce document instance mapping 540, document type definitions mapping 550, and schema mapping 560. Information from other document instances might be used, and information might be extracted from an appropriate stylesheet that matches the document's vocabulary. This additional information enables better understanding of the document that can in turn enable better styling.

There are several possible ways to capture the information extracted by the analysis stage. One is to add it to the document instance (e.g. as additional attributes). Another is to create a separate data file that contains the information and references the elements of the original document instance. A third is to transform the original document into an intermediate form that expresses the discovered structures and features. The third approach allows the styling application of the second stage to follow typical styling methods. It therefore may permit the use of conventional tools for the creation of stylesheets for the second stage styling operation.

As further illustrated in FIG. 4, an analyzer 530 examines the document instance and any matching schemas or document type definitions that might be available. The results of the analysis may be captured in a "mapping file" that indicates how the original document should be mapped to the intermediate format.

This mapping file is fed to a transformation generator 570 which creates a transformation 580 that is applied to the original document, by an extensible stylesheet language transformer 590 to generate an instance in the intermediate format. This completes the first stage 1000 of the processing.

In the second stage 2000, a stylesheet is selected 600 and applied 610 to the intermediate format to produce the styled document. In extensible markup language processing this may be done by first using a transformation engine to decorate the document with formatting commands in a language such as extensible stylesheet language formatted object. A formatter 620 (such as a formatted object to portable document format formatter) applies the commands to produce the formatted document.

It is noted that generic structural elements alone are not sufficient to support this scenario. One may know that strings support the style "bold," so "bold" should only be applied to string elements, but perhaps not every string element should be "bold." Some additional attributes are needed to decide which strings should be "bold" and which should not. In order to support generic stylesheets, these attributes should also be generic in nature. Such attributes can be defined, although the optimal set of attributes is still an open problem. Examples of such attributes are: text-like, number-like, name-like, address-like, date-like, title-like, labeling, summarizing, attention-grabbing, separating, important, distinctive, depth in the structure, and similarity to siblings. These attributes are given numerical values that range between 0 and 1. A generic stylesheet can use these attributes to differentiate the structural elements.

For example, a string with a strong title-like attribute might be styled as bold while those with a low value for the attribute might be given normal weight. The above approach requires that a set of generic stylesheets be constructed and available for use on documents that are converted to the generic document format. The above approach addresses the question of adapting an existing non-generic stylesheet for generic use. This can make it easier to create a library of generic stylesheets and may allow one to apply a favorite stylesheet to a document in a vocabulary different from the one for which it was written. The method applies to stylesheets such as those in extensible stylesheet language transform that contain extensible path patterns and expressions for the document elements.

The method assumes there is a mapping from the stylesheet vocabulary to the elements and attributes of a generic document format such as the one referenced above. The stylesheet references are automatically replaced with specific elements in a vocabulary by references to a generic element and a set of attribute tests that result in the same selection.

This approach will work for simple stylesheets that apply styles according to element name. Complex stylesheets that make use of other document properties such as the structural relationships between elements may not work as well on other vocabularies that may not have those relationships, even though they are converted to the generic document format. The fundamental problem of converting a stylesheet to a generic form is to find a set of generic attribute tests that will select for a particular element.

It is noted that elements are first distinguished by their generic structural type (string, paragraph, list, table, etc). An element is distinguished that maps to a string from other elements that also map to a string. An attribute test is not needed to differentiate string elements from table elements because the element type already does this.

The first step is to group the elements by structural type, and to use only the attributes to distinguish elements within a structural type. The elements that need to be distinguished from one another into a set are gathered, and then the set with attribute tests are recursively subdivided until single sets are realized, or until the set elements can no longer be distinguished by their attributes.

An average value for each attribute for each element is captured. If the document instance is being used to determine attribute values, there can be more than one appearance of an element type in the document instance. This appearance of more than one element type in the document instance is dealt with that by averaging the attribute values calculated for each appearance. For the set of elements that needed to be subdivided, each attribute and for the attribute determined the size of the largest separation between the values from the elements in the set are analyzed.

From the analysis, it can be decided which attribute has the largest gap and this attribute for the test that subdivides the set can be used. A threshold at the midpoint of the gap is set and all elements with an attribute value below the threshold are collected in one set, while those with values above the threshold form another set. The attribute threshold test is added to the tests that define the sets.

The process is recursively repeated on each of the two new subsets to further divide them until single element sets are obtained (or no gaps are found in the attribute values). At each division, another test is added to the collection needed to define the set, so that when a single element set is obtained, the corresponding collection of attribute tests provides a generic alternative expression for the element.

Another implementation replaces the average attribute values with ranges or intervals for values. As before, gaps in values for each attribute may be realized, only in this implementation the gaps between the value intervals are analyzed. The intervals provide a more realistic characterization of the element's behavior with respect to the attribute and allow gaps and threshold to be selected that are more likely to distinguish elements found in new documents.

Once a generic replacement has been determined for each element the stylesheet can be transformed or converted. The process parses the patterns and expression in the stylesheet looking for explicit element references. When such a reference is found it is replaced by a reference to the corresponding generic element with the corresponding attribute tests.

In summary, the extensible markup language document processing engine performs arbitrary processing on extensible markup language documents. The processing sequence of the extensible markup language document processing engine is not fixed, but rather can depend upon the information submitted with the job and upon determinations and analysis during the actual job processing. The extensible markup language document processing engine can also segment the document processing so that different fragments of the document are handled differently, thereby providing parallel processing capabilities. Moreover, the extensible markup language document processing engine can segment the document processing so that different fragments of the document are handled differently so that not all processing is blocked when a fragment requires a slow action, such as retrieval of information from the web.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for providing a transformation from an extensible markup language document having an arbitrary vocabulary to a document instance in an intermediate format, comprising:

analyzing, using a set of heuristic rules, a document instance of the extensible markup language document having the arbitrary vocabulary to determine a mapping between the arbitrary vocabulary of the extensible markup language document and a vocabulary designed to express a logical structure of the extensible markup language document having the arbitrary vocabulary;

analyzing instance schema of the original document to produce a schema mapping; and generating a transformation from the determined mapping and the produced schema mapping.

2. The method as claimed in claim 1, wherein a logical structure element is a paragraph.

3. The method as claimed in claim 1, wherein a logical structure element is a group.

4. The method as claimed in claim 1, wherein a logical structure element is an ordered list.

5. The method as claimed in claim 1, wherein a logical structure element is a table.

6. The method as claimed in claim 1, wherein a logical structure element is a text string.

7. The method as claimed in claim 1, wherein the document instance in an intermediate format includes content characterization attributes.

8. The method as claimed in claim 7, wherein the content characterization attributes include attributes that capture the type of the content.

9. The method as claimed in claim 7, wherein the content characterization attributes include attributes that capture the function of the content.

10. The method as claimed in claim 7, wherein the content characterization attributes include attributes that capture the structural characteristics of the content.

\* \* \* \* \*